United States Patent [19]

Sartorio

[11] 4,233,704
[45] Nov. 18, 1980

[54] OIL DIPSTICK CLEANING DEVICE

[76] Inventor: Lucio A. Sartorio, Piazza del Teatro 21, Velletri, (Rome), Italy

[21] Appl. No.: 39,114

[22] Filed: May 15, 1979

[30] Foreign Application Priority Data

May 23, 1978 [IT]  Italy ................................. 49495 A/78
Dec. 4, 1978 [IT]  Italy ................................. 52187 A/78
Apr. 23, 1979 [IT]  Italy ................................. 48820 A/79

[51] Int. Cl.³ ............................................ G01F 15/12
[52] U.S. Cl. ................................................. 15/210 B
[58] Field of Search .................... 15/210 B, DIG. 11; 33/126.7 R

[56] References Cited

U.S. PATENT DOCUMENTS

| 1,652,875 | 12/1927 | Rein ..................................... 15/210 B |
| 1,747,100 | 2/1930 | Ashworth ........................... 15/210 B |
| 1,916,933 | 7/1933 | Peck ..................................... 15/210 B |
| 2,422,512 | 6/1947 | Wright ................................. 15/210 B |
| 3,041,730 | 7/1962 | Feigin ............................. 15/210 B X |
| 3,205,525 | 9/1965 | Birtzer ................................. 15/210 B |
| 4,010,512 | 3/1977 | Addison ............................. 15/210 B |

FOREIGN PATENT DOCUMENTS 316783 4/1934 Italy ....................................... 15/210 B Primary Examiner—Edward J. McCarthy
Attorney, Agent, or Firm—Watson, Cole, Grindle & Watson

[57] ABSTRACT

A device adapted to permit the cleaning of the dipstick employed to measure the oil level in engines, includes a support preferably of a metallic material adapted to hold and contain a pad of rubber, foam rubber, or other suitable materials, the oil-dipstick being within the pad.

13 Claims, 26 Drawing Figures

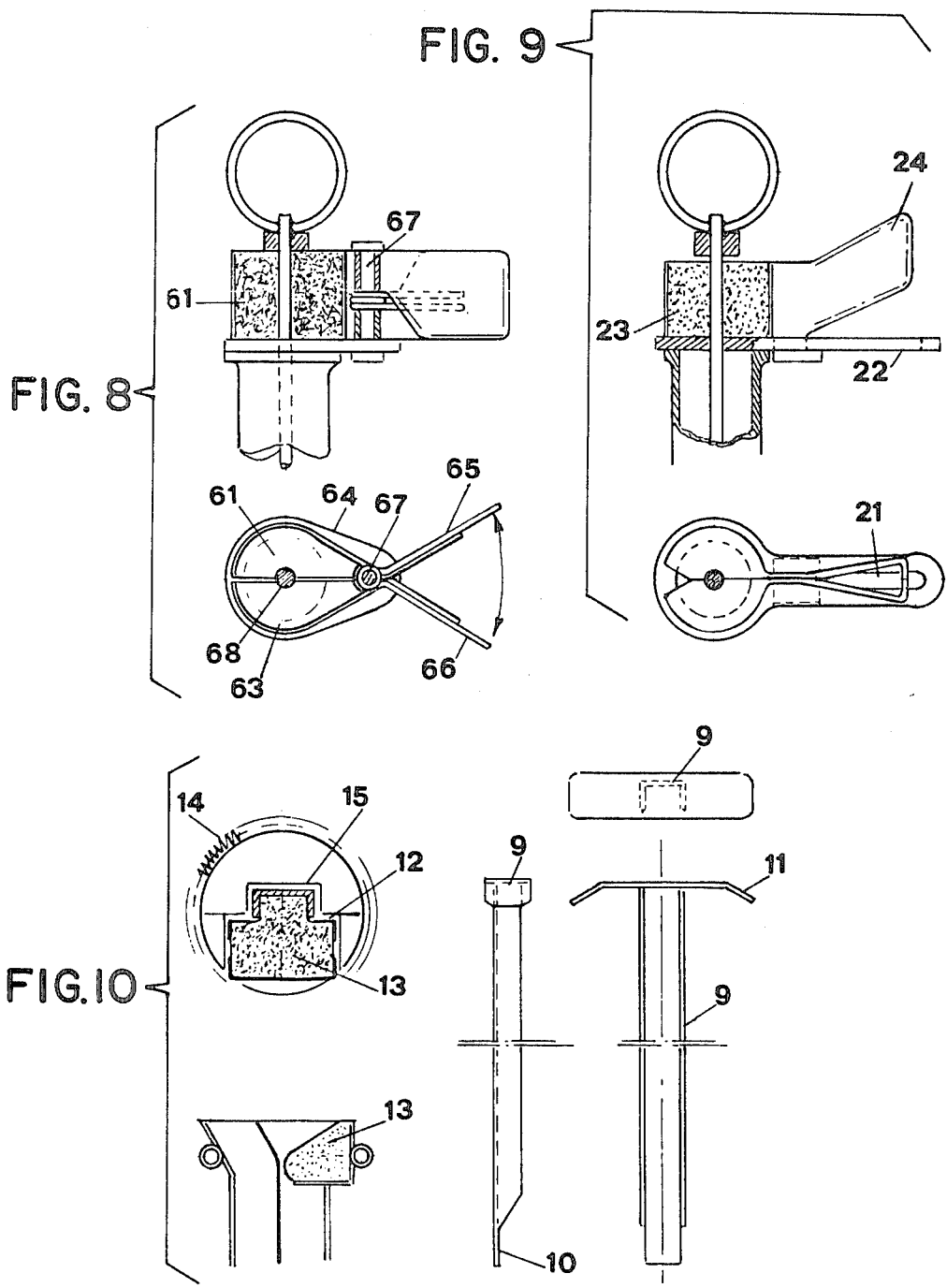

OIL DIPSTICK CLEANING DEVICE

BACKGROUND OF THE INVENTION

It is known that one of the controls which must be effected frequently and regularly in engines, of every type, such as automobiles, lorries or marine engines, of internal combustion or of Diesel type, is the control of the oil level, since, if the level of the lubricating oil is low, or positively below the minimum, the engine may undergo severe damages. It is known as well, however, that motorists are often reluctant to effect the control of oil level because it is a rather tiresome and messy operation.

On the other hand, presently available pneumatic devices for a few deluxe cars are unreliable, since the failure of a small accessory, which is rather delicate, might cause rather serious damages.

It is also to be noted that, because of the abovementioned drawbacks, most motorists entrust petrol station personnel with the control of the oil level, and these people do use rags to clean the measuring stick, these rags being oftentimes picked up from the ground. Dirt and grit is therefore likely to be introduced into the engine.

SUMMARY OF THE INVENTION

The object of the present invention is to provide a device adapted to allow the cleaning of the dipstick for the measurement of the oil level in engines, the cleaning operation obviating the abovementioned disadvantages.

The device of the present invention includes a pad of cleaning and lubricating-oil-resistant material, the pad resisting the occasional chemical additives which may be introduced into the oil sump in order to improve the lubrication and the efficiency of the engine.

BRIEF DESCRIPTION OF THE DRAWING

FIGS. 8 and 9 are sectional and plan views of further embodiments according to the invention;

FIGS. 10, 11, 12 and 13 are part-sectional and plan views of still further embodiments;

DESCRIPTION OF THE PREFERRED EMBODIMENTS

Figure 1:
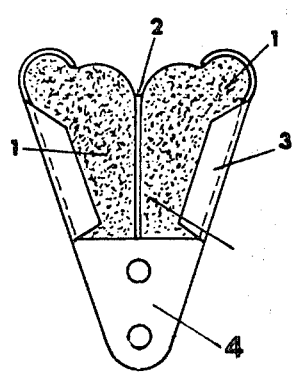
FIGS. 1 and 2 are side and end elevational views of a device according to the invention.
Figure 2:
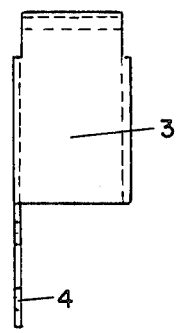
Figure 3:
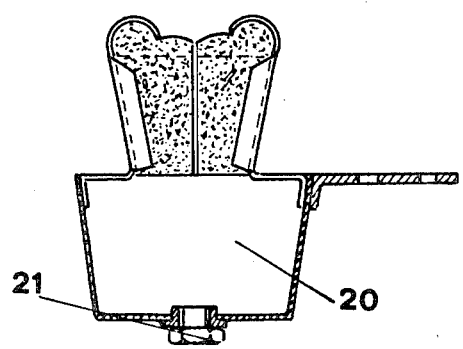
FIGS. 3 and 4 show the device of FIGS. 1 and 2 together with a container.
Figure 4:
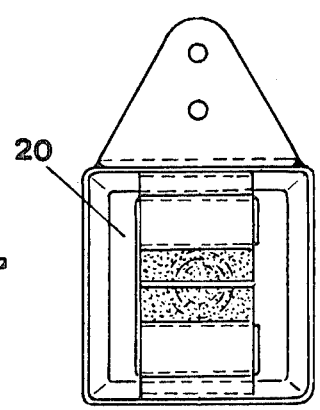

Referring now to the drawings, and in particular to FIGS. 1 and 2, the device according to the present invention includes a pad 1 of a cleansing material centrally divided by a slit 2 and made integral with a metal support 3 or a support of other suitable material, having for example a triangular shape, and provided, at the apex, with a suitably pierced support 4, which allows the support to be anchored at any desired position in the engine compartment or the like. In order to achieve the cleansing action, it will suffice to insert the oil measuring dipstick (not shown) into the slit 2 and effect with the dipstick itself a vertical motion. As shown in FIGS. 3 and 4, the device may be mounted on a small tank 20 provided with an emptying plug 21.

Figure 5:
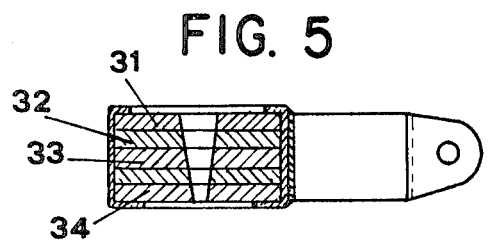
FIGS. 5, 6 and 7 are sectional, plan and detail views of a device and cleansing pad according to another embodiment.
Figure 6:
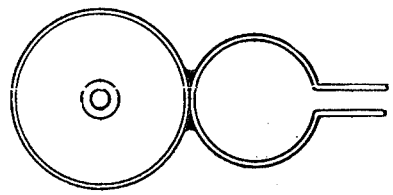
Figure 7:
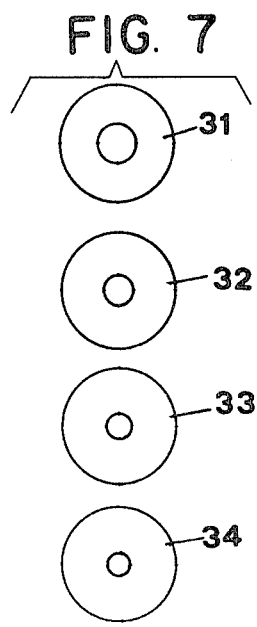

Many variations and modifications are made possible for the device according to the present invention, including both the pad and the measuring stick. In particular, FIGS. 5, 6 and 7 illustrate a different type pad having a suitable support, and comprising a sequence of elements or members 31, 32, 33 and 34 which are preferably circular in shape, made of a cleansing material and provided, at the middle or central portion, with aligned holes having a progressively diminishing diameter starting from the upper disc 31 down to the lower disc 34, in such a way to form, in the upper portion of the buffer, a convenient facility for the insertion of the dipstick and, at the lower portion of the buffer itself, an efficient tool for the cleansing of the pad itself.

In FIG. 9 another arrangement is shown as having a support 22 provided with a longitudinal slot 21. A cleansing buffer 23 is mounted on the support by a holder 24 having a depending flange engaging slot 21. The buffer is centrally split as at 25 so that, with one hand, the operator simply moves the buffer to surround the dipstick D and pulls the dipstick through the buffer so as to wipe it clean.

An oil dipstick 9, shown in FIG. 10, is substantially U-shaped in cross-section and is provided with an appropriate tapering 10 which facilitates its insertion.

A handle 11 of the dipstick is provided with a reference mark (not shown) which serves to indicate the measuring and cleansing positions.

At the cleansing position, the dipstick is inserted into a U-shaped portion of hole 12 which is provided with a cleansing pad 13 which is kept in position by an appropriate elastic or screw-member 14. The measuring stick, therefore, when it is extracted from that position, is wiped perfectly clean.

The dipstick may thereafter be inserted into an opposite portion 15 of the "U" allowing the measurement of the oil level in the engine to take place, the dipstick thereby not being cleansed by the pad during this insertion.

Figure 11:
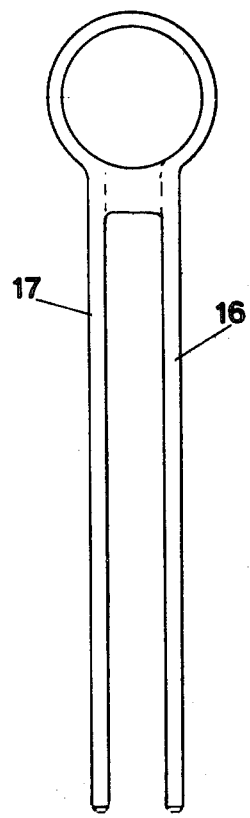
Figure 12:
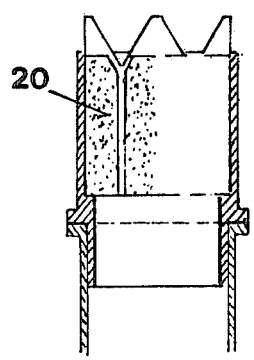
Figure 13:
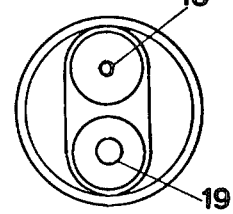

In FIGS. 11, 12 and 13 a further embodiment is shown wherein the dipstick is halved into two vertical elements 16 and 17 which are inserted through jackets 18 and 19, the first of which is intended for the cleansing of the dipstick and is, therefore, provided with an appropriate buffer or pad 20, while the other jacket is intended for the measurement and is, therefore, free of any cleansing pad.

During the measurement and the extraction operation, one of the two dipstick elements 16 and 17 will exit clean from the pad 20; therefore, it will suffice to reinsert the measuring stick, rotated by 180° and re-extract it in order to get immediately, without getting soiled, an indication of the oil level.

Figure 14:
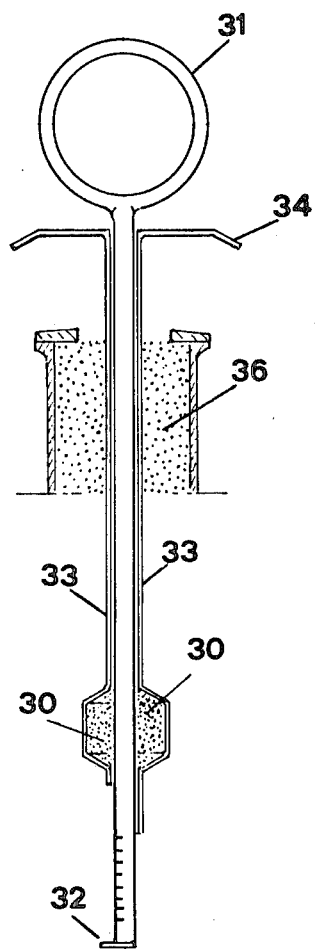
FIG. 14 is a plan of a still further embodiment of the present device.

FIG. 14 shows another embodiment according to the invention wherein a jacket 33 containing the measuring stick is provided, at its lower portion, with a cleansing pad 30, while at its upper portion it is provided with an appropriate handgrip 34. The operation mode of this device is very simple and practical. For cleansing the dipstick, it is necessary to pull a grip-ring 31 of the dipstick, so that the dipstick, sliding inside the jacket and in particular coming into contact with the pad 30, will be freed from the oil sticking to it. It is important to observe that the dipstick is prevented from exiting completely by the provision, at the lower end, of a check tongue 32 which, at the end of the pull stroke, will abut against the jacket 33. Therefore, by re-inserting the dipstick completely into the jacket 33 and extracting it by means of the handgrip 34, one gets, along the graduated end of the dipstick, the precise indication of the oil level. In order to tightly connect jacket 33 with a support fixed to the engine, but at the same time be extractable, a deformable elastic member 36 is provided which acts as a braking or cushioning element.

In order to render this device effective for any type of measuring stick, and therefore also for dipsticks of non-European cars, some modifications are provided for the device, which will allow for the cleansing of dipsticks of any shape.

FIG. 8 shows, for example, a modification of the device which includes pad sections 61 of cleansing material respectively connected to semicircular elements, 63 and 64, which are made of a metal or other suitable material. These elements are provided, at their ends, with two levers 65 and 66 which control the opening of elements 63 and 64, their closing taking place by means of suitable elastic members 67 which may be a spring or the like. In order to take an oil level measurement, dipstick 68 is extracted and is thereby cleansed by pad sections 61, arms 65 and 66 are moved toward one another for moving the pad sections apart to thereby prevent operation of the pad, the dipstick is reinserted and withdrawn so that the level of the oil can be read.

Figure 15:
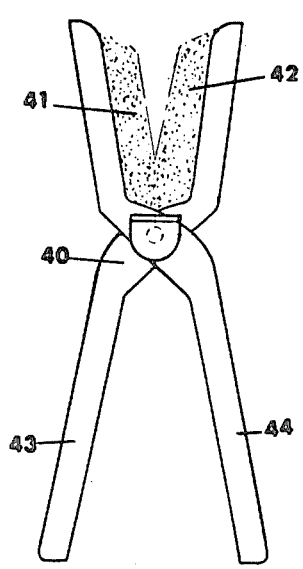
FIGS. 15 to 19 are side and plan views of the device in the form of a pair of pliers.

In FIG. 15 another modification is illustrated which allows the quick cleansing of measuring dipsticks having any desired shape or form, and which allows the device to be utilized even when a good portion of the pad is worn. As seen in FIG. 15, the device comprises pliers 40 which, on the end opposite the handgrip, are provided with two cleansing pads 41 and 42 secured to the jaws of the pliers. The utilization is very simple since it will suffice to place the dipstick between the two pads 41 and 42 and successively to clamp, by means of hand levers or grips 43 and 44, the pads themselves arround the measuring dipstick, while at the same time allowing the dipstick to slide. Such device according to the present invention is particularly useful when employed to effect high frequency of cleansing actions, as for example during use by service station personnel, since it achieves a faultless cleansing action, even if a pad or the pads are worn out.

Figure 16:
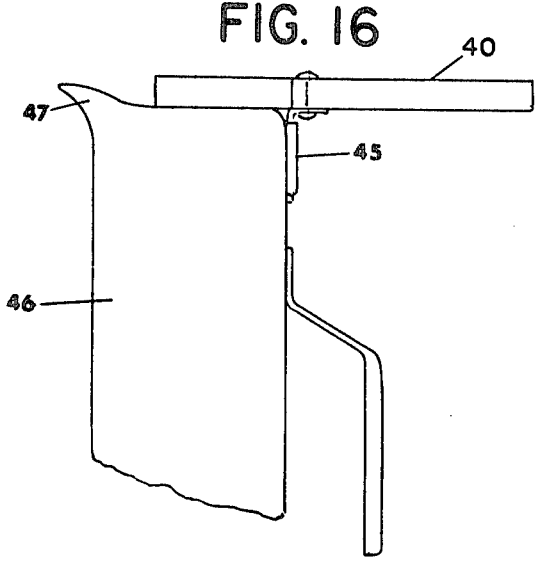
Figure 17:
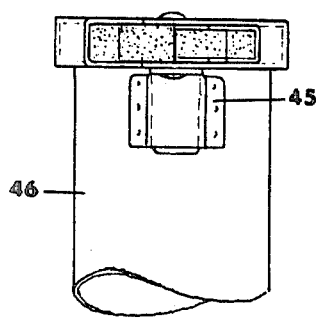
Figure 18:
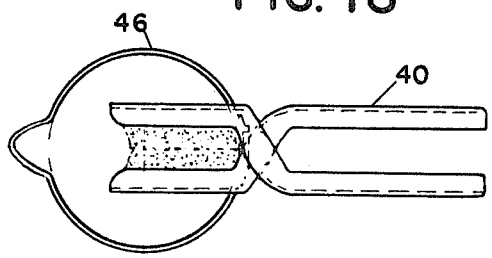

Mainly for this type operation, an appropriate container may be provided, which is shown, together with the device, in the FIGS. 16, 17 and 18. The cleansing pliers can, indeed, by the provision of a support 45 shown in FIG. 17, be mounted on a container or reservoir 46, so that the oil dripping during the cleansing of the dipstick will fall into the container, thereby preventing the soiling of the floor. In such manner the oil, by the provision of an appropriate spout 47 on container 46, may be employed for small operations in which a lubricating action is needed.

Figure 19:
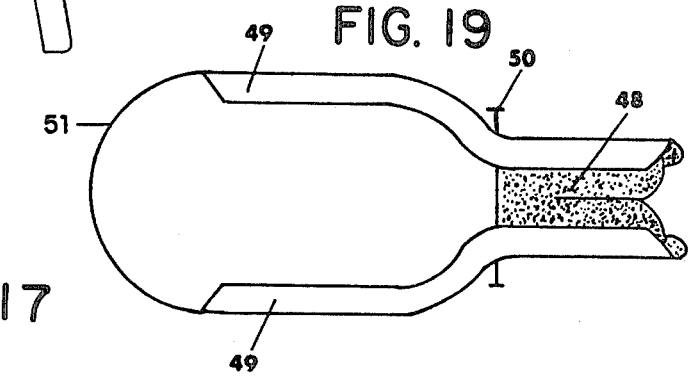

In FIG. 19 a variant is shown which, though it utilizes the aforedescribed principles, presents a remarkable facility in carrying out the invention, together with a simple and safe use. The device includes a metal support 51 and a rubber pad 48 or the like mounted to an end of the support, the pad being provided with a center slit intended for the insertion of the dipstick. Support 51 is bent at right angles along opposite sides 49 for anchoring the pad in place and for stiffening the support itself, though it maintains the support itself sufficiently elastic.

And, a transversely extending retaining element 50 may be provided behind the pad for retaining it in place, element 50 likewise being capable of anchoring an oil-collecting tank to the support. For cleansing the dipstick, it is simply passed along the center slit of the pad while holding the handle portion of the support.

Furthermore, in order to anchor the device inside the hood of the engine, or in other suitable places, magnets or other anchoring means may possibly be used.

From the foregoing, it can be seen that the invention provides the user with a fitting or fixture which allows him to cleanse, without soiling the hands, the measuring stick for the oil level and which is extremely practical and easy to use, and is also inexpensive to produce and, therefore, may be offered at a very low selling price.

Figure 20:
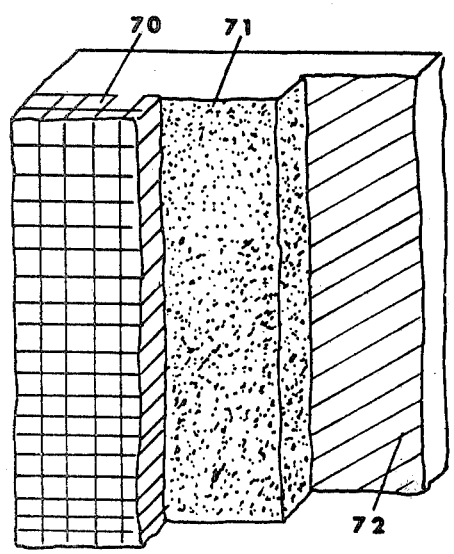
FIGS. 20 to 26 show other variants according to the invention.
Figure 21:
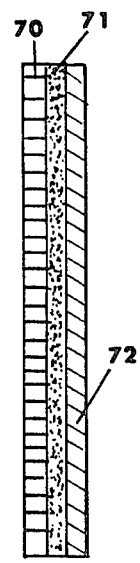

Further according to the invention, a cleansing cloth (FIGS. 20 and 21), having a suitable size, includes three layers: an external grid 70 which performs the dual task of cleansing the dipstick and retaining an intermediate layer 71 which is made of an absorbing material, particularly when the layer 71 is of a material which frays easily, thus requiring a containing support; and a layer 72 which is, on the contrary, impermeable, so that it will prevent the oil absorbed by the intermediate layer from precolating.

Figure 22:
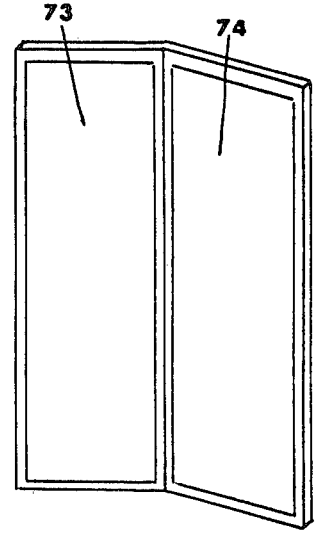

It is apparent that a dipstick-cleaner described above can be employed without any support, that is as a cloth, with the advantage that, since the external layer 72 is impermeable, it will prevent the oil removed from the dipstick from percolating and therefore soiling the hands. If, instead, the dipstick-cleaner is to be stored with the use of a magnet, for example, within the hood of the engine, it is feasible to insert the cloth within a suitably shaped support, as for example the support shown in FIG. 22, so that the dipstick may be inserted between the two faces 73 and 74 which, when folded against one another, will form an extremely reliable cleansing element.

Figure 23:
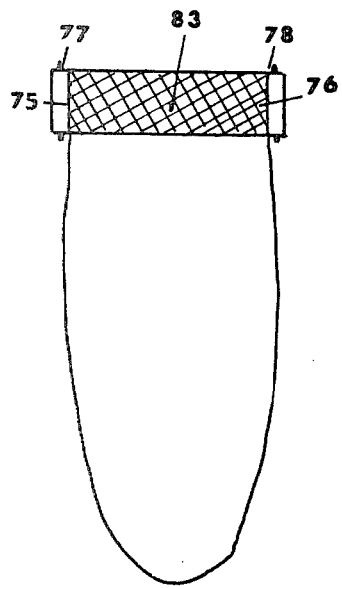
Figure 24:
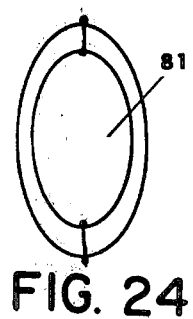

In FIGS. 23 and 24 another embodiment is shown, wherein the cleansing fabric is formed as a small bag, so that it will be albe to internally receive a measuring dipstick, and it is provided, exteriorly, with an elastic support 83, which may be of plastic or steel or other suitable material, which, in the rest position, keeps the upper portion of the small bag closed or, depending on its shape, leaves a small opening, whereas, if squeezed at the apices 75 and 76 inwardly, it will open, as at 81, against the elastic action of support 83 or, owing to hinges 77 and 78, with which it is provided, it will assume an oval shape.

The operation is, in this case too, very simple, since it will suffice to insert the measuring dipstick within the bag, to press by one hand the bag around the dipstick and to extract the dipstick itself. And, if the device is to be anchored inside the hood of the engine, as with the use of a magnet, such may be provided for the aforedescribed.

Figure 25:
Figure 26:
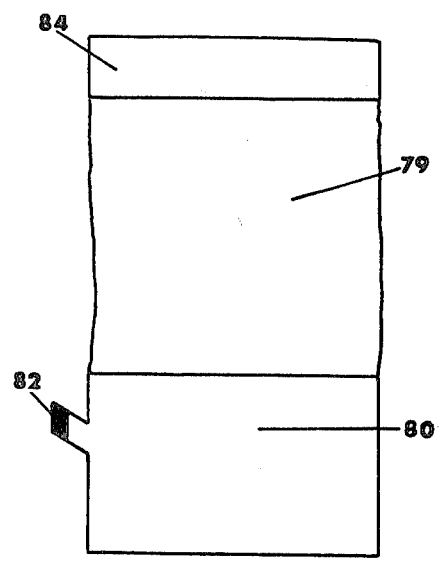

FIGS. 25 and 26 illustrate another device as including an upper cleansing portion 79, an upper support 84, elastic or non-elastic, which has a hole 81' for insertion of the dipstick, and of a lower container or tank 80 apted to collect the oil which is removed from the dipstick, and provided with a discharge spout 82.

The operation is similar to that of the previously described dipstick-wiper (or dipstick-cleaner). For example, the dipstick to be cleaned is inserted into the hole 81′, a portion of fabric 79 is pressed around the dipstick which is then extracted.

Fabric 79 may be of a non-absorbent material so as to render it more durable for use in service stations.

I claim:

1. An oil dipstick cleaning device, comprising a support having a pair of pivotally interconnected, semi-circular hollow jaws in contact with one another in a closed position, lever arms on said jaws having terminal ends spaced apart in said closed position of said jaws, means for biasing said jaws into said closed position, and cleaning pads disposed within said hollow jaws in confronting relationship in said closed position, said jaws including said pads being movable into an open position away from one another upon movement of said terminal ends of said arms toward one another against the action of said biasing means, whereby an oil dipstick to be cleaned may be inserted between said jaws in said open position, said jaws being then moved into said closed position, and the dipstick being wiped clean by said pads upon extraction thereof.

2. An oil dipstick cleaning device, comprising a support having an elongated slot therein, a holder having a flange engaging said slot said holder having a cleaning pad retaining portion, a cleaning pad being disposed in said portion and having a central slit therein lying parallel to said slot, and said support having an opening, whereby an oil dipstick to be cleaned extends through said opening with said holder being shifted along said slot so as to move said pad away from the dipstick, said holder then being moved along said slot until said pad surrounds the dipstick via said slit, the dipstick then being extracted from said pad.

3. An oil dipstick cleaning device, comprising a support having a pair of axial openings, a pad of cleaning material disposed within only one of said openings and having a passageway therein, in combination with an oil dipstick having a pair of elongated elements respectively inserted through said passageway and through the other of said openings, said elements extending into a quantity of oil for measuring the level thereof, whereby upon extraction of the dipstick one of said elements extending through said passageway is wiped clean by said pad and the other of said elements being used to read the level of the oil, and whereby re-insertion of the dipstick with said one element extends through said other opening and said other element extends through said passageway permits said other element to be wiped clean and said one element to be used for reading the oil level upon again extracting the dipstick.

4. An oil dipstick cleaning device, comprising a support having a pair of axial U-shaped passageways, a pad of cleaning material disposed in only one of said passageways, in combination with an oil dipstick having a U-shaped cross-section, said dipstick when extending through said one passageway being wiped clean along one side thereof by said pad, and said dipstick when extending through the other of said passageways being available for reading the level of the oil into which it extends.

5. An oil dipstick cleaning device, comprising an elongated portable jacket having a cleaning pad disposed therein near one end thereof, an oil dipstick extending through said jacket and through an opening provided in said pad, whereby said dipstick may be wiped clean upon sliding movement thereof within said pad, said dipstick extending beyond said one end for measuring the level of oil into which it extends.

6. The device according to claim 5, wherein said dipstick has a transversely extending tongue at said end thereof for retaining said dipstick with said jacket upon sliding movement thereof.

7. An oil dipstick cleaning device, comprising an implement in the form of pliers having a pair of jaws pivotally interconnected for movement toward and away from one another, lever arms on said jaws for effecting said movement, and cleaning pads mounted on said jaws in confronting relationship, whereby an oil dipstick may be wiped clean by movement of said jaws toward one another to engage said dipstick, and sliding said dipstick or said pliers relative to one another axially of said dipstick.

8. The oil dipstick cleaning device according to claim 7, further comprising an oil collecting tank, said pliers being mounted to said tank, whereby the oil wiped from said dipstick is collected in said tank.

9. An oil dipstick cleaning device, comprising a support having a handgrip at one end and a pad retaining portion at an opposite end thereof, a cleaning pad mounted at said opposite end, said pad having a slit therein facing said opposite end, and a retaining element extending transversely through said support at an inner end of said pad for retaining said element in place, said element also serving as an anchor for mounting an oil collection tank to said support, whereby an oil dipstick may be wiped clean by sliding same along said slit of said pad.

10. An oil dipstick cleaning device, comprising a cleaning fabric comprised of first, second and third superimposed layers secured together, said first layer being of a cleansing material, said second layer being of an oil absorbing material and said third layer being of an oil impermeable material, whereby oil may be wiped clean from a dipstick by sliding it along said first layer, said third layer preventing the oil removed from the dipstick from percolating and therefore soiling hands of the user.

11. The oil dipstick cleaning device according to claim 10, further comprising a support including a panel having a central foldline, said fabric being secured to said panel and being foldable along said foldline.

12. The oil dipstick cleaning device according to claim 10, wherein said fabric is bag-shaped with said first layer facing inwardly, an elastic support surrounding the opening of said bag-shaped fabric to facilitate the opening and closing thereof.

13. The oil dipstick cleaning device according to claim 12, wherein a bottom portion of said bag-shaped fabric comprises a collecting tank for the oil wiped from the dipstick.

* * * * *